US008193979B2

(12) United States Patent
McBurney

(10) Patent No.: US 8,193,979 B2
(45) Date of Patent: Jun. 5, 2012

(54) AGPS SERVER WITH SBAS AIDING INFORMATION FOR SATELLITE BASED RECEIVERS

(75) Inventor: Paul W. McBurney, San Francisco, CA (US)

(73) Assignee: eRIDE, Inc., San Francisco, CA (US)

( * ) Notice: Subject to any disclaimer, the term of this patent is extended or adjusted under 35 U.S.C. 154(b) by 160 days.

(21) Appl. No.: 12/760,869

(22) Filed: Apr. 15, 2010

(65) Prior Publication Data

US 2011/0254730 A1     Oct. 20, 2011

(51) Int. Cl.
*G01S 19/07*     (2010.01)
*G01S 19/03*     (2010.01)

(52) U.S. Cl. .................. 342/357.44; 342/357.4

(58) Field of Classification Search ............. 342/357.24, 342/357.42, 357.44, 357.45, 357.64, 357.4; 701/213, 215, 412, 468
See application file for complete search history.

(56) References Cited

U.S. PATENT DOCUMENTS

2011/0212733 A1*   9/2011   Edge et al. ................. 455/456.1
* cited by examiner

*Primary Examiner* — Dao Phan
(74) *Attorney, Agent, or Firm* — Law Offices of Thomas E. Schatzel, A Professional Corp.

(57) ABSTRACT

A satellite navigation system assistance server is configured to reply to client requests that include an indication of the client's location, and if an accurate location is included in the server request, the satellite navigation system assistance server computes which particular SBAS systems are observable to the requesting client, and in this case the satellite navigation system assistance server limits its replies to pertinent information for a more compact response message.

9 Claims, 2 Drawing Sheets

AGPS SERVER WITH SBAS AIDING INFORMATION FOR SATELLITE BASED RECEIVERS

BACKGROUND OF THE INVENTION

1. Field of the Invention

Figure 1:
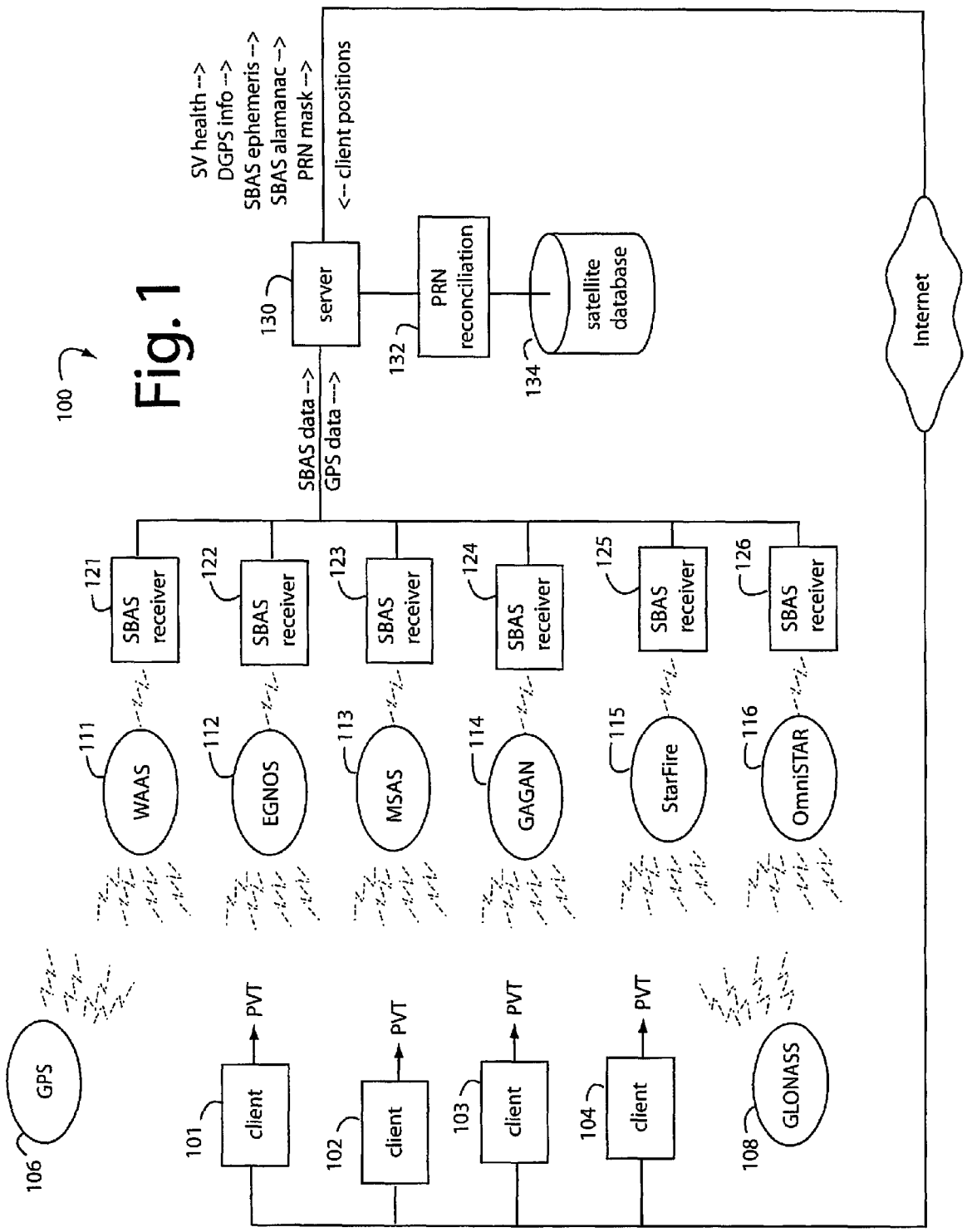

The present invention relates to satellite navigation systems, and in particular to worldwide reference stations for compiling lists of geostationary satellite based augmentation system (SBAS) satellites that will be visible to particular ground locations so that navigation receivers provided with this information from a network server can intelligently search for, acquire, and track the pseudorandom number (PRN) signals of the SBAS satellites visible to them.

2. Description of the Prior Art

The Wide Area Augmentation System (WAAS) is an air navigation aid developed by the Federal Aviation Administration to supplement the Global Positioning System (GPS). The goal is to improve the accuracy, integrity, and availability of GPS. WAAS was planned to let aircraft rely on GPS for precision approaches, and other phases of flight. WAAS uses a network of accurately surveyed ground-based reference stations in North America and Hawaii to detect errors in the GPS satellites' transmissions at the earth's surface in a variety of regions. The measurements are forwarded region-by-region to master stations. A Deviation Correction (DC) is sent in correction messages to geostationary WAAS satellites at least every five seconds. The geostationary WAAS satellites then broadcast correction messages back to North America and Hawaii so WAAS-enabled GPS receivers can include the corrections in their navigation position calculations. WAAS does not provide service to Europe or Asia because the geostationary WAAS satellites are not visible there, and the measurements that are taken are not applicable there.

The International Civil Aviation Organization (ICAO) refers to WAAS as a Satellite Based Augmentation System (SBAS). Europe and Asia have corresponding SBAS deployments, namely the European Geostationary Navigation Overlay Service (EGNOS), the Indian GPS Aided Geo Augmented Navigation (GAGAN), and the Japanese Multi-functional Satellite Augmentation System (MSAS). Commercial SBAS operations include StarFire and OmniSTAR. These have geostationary satellites parked above their respective service areas. So no one place on earth has visibility to WAAS, EGNOS, GAGAN, MSAS, and the others simultaneously.

WAAS position accuracies are supposed to be better than 7.6 meters (25') for both lateral and vertical measurements, at least 95% of the time. Tests have shown it typically provides solution accuracies better than one meter (3'3") lateral, and 1.5 meters (4'11") vertical throughout most of North America. WAAS therefore meets required Category I precision approach accuracies of sixteen meters (52') lateral, and four meters (13.1') vertical.

Maintaining the integrity of the navigation system requires timely warnings when misleading data is being provided that could create hazards. The WAAS specification requires the system monitor and detect errors in the GPS and WAAS networks and notify users within 6.2 seconds. Certifying that WAAS is safe for instrument flight rules (IFR) requires proof that any error exceeding the requirements for accuracy will not go undetected. Specifically, the probability is stated as $1 \times 10^{-7}$, and is equivalent to no more than three seconds of bad data per year. This provides integrity information equivalent to or better than Receiver Autonomous Integrity Monitoring (RAIM).

The WAAS ground segment includes several Wide-area Reference Stations (WRS) with precisely surveyed locations that monitor and collect information on the GPS signals, then send their data to three Wide-area Master Stations (WMS) using a ground based communications networks. The reference stations also monitor signals from the WAAS geostationary satellites, providing integrity information regarding them as well. In Oct. 2007 there were thirty eight WRS. Twenty of these in the contiguous United States (CONUS), seven in Alaska, one in Hawaii, one in Puerto Rico, five in Mexico, and four in Canada. Data from the WRS sites is used by each WMS to generate fast and slow sets of corrections. The fast corrections are for rapidly changing errors, and primarily concern the instantaneous positions and clock errors of the GPS satellites. These corrections are user position-independent, they can be applied immediately by receivers in the WAAS broadcast area. The slow corrections relate to long-term ephemeris and clock error estimates, and ionospheric delay information. Delay corrections are provided for points organized in a grid pattern across the WAAS service area. Each WMS sends the correction messages through redundant Ground Uplink Stations (GUS) to the geostationary satellites in the space segment, and rebroadcast to the user segment.

The WAAS space segment has many geosynchronous communication satellites that broadcast the correction messages from the Wide-area Master Stations for reception by the User segment. They also each broadcast range information like GPS satellites, effectively increasing the number of satellites available for a position fix. Originally, the space segment had two commercial satellites, Pacific Ocean Region (POR) and Atlantic Ocean Region-West (AOR-W). These were actually space leased on the Inmarsat III satellites which ceased WAAS transmissions on Jul. 31, 2007. Two new satellites, Galaxy 15 and Anik F1R, were launched in late 2005. Galaxy 15 is a PanAmSat, and Anik F1R is a Telesat. These too are leased services under the FAA's Geostationary Satellite Communications Control Segment contract with Lockheed Martin for WAAS geostationary satellite leased services. Lockheed Martin is contracted to provide up to three satellites through 2016. Ranging data from Galaxy 15 and Anik F1R has been flagged as "Precision Approach."

| Satellite | NMEA | PRN | Location |
|---|---|---|---|
| Inmarsat 4F3 | NMEA #46 | PRN #133 | 98° W |
| Galaxy 15 | NMEA #48 | PRN #135 | 133° W |
| Anik F1R | NMEA #51 | PRN #138 | 107.3° W |

A first order of business for a SBAS receiver is to collect the PRN mask. It needs this before it can make use of the SBAS messages. Collecting the PRN mask can take up to a minute. After receiving the PRN mask, the SBAS receiver must settle on the appropriate satellite health and differential GPS corrections to use. The ephemerides are needed to get the ranges and include the SBAS satellite in a fix. But, getting the ephemerides is a lower priority than getting the satellite health and differential GPS corrections. So, an autonomous SBAS receiver will generally not have SBAS data available before a first fix is possible. That first fix may not be very accurate, at least not up to what is usual for an SBAS assisted navigation receiver.

Galileo is a global navigation satellite system (GNSS) being built by the European Union (EU) and its European Space Agency (ESA). It will be redundant to the United States Global Positioning System (GPS) and the comparable Russian system, GLONASS. Galileo is expected to be operational by 2014 with two ground operations centers, one near Munich, Germany, and the other just east of Rome, Italy. Galileo is projected to make available more precise measurements than are widely accessible with GPS or GLONASS, especially at high latitudes. The political aim is to provide an independent positioning system upon which the European nations can rely, since Russia and the USA both have the military option to switch on signal encryption. The basic Galileo services are to be free and open to everyone, but its high-accuracy capabilities will be restricted to EU military users and commercial subscribers.

SUMMARY OF THE INVENTION

Briefly, a satellite navigation system assistance server embodiment of the present invention is configured to reply to client requests that include an indication of the client's location, and if an accurate location is included in the server request, the satellite navigation system assistance server computes which particular SBAS systems are observable to the requesting client, and in this case the satellite navigation system assistance server limits its replies to pertinent information for a more compact response message. The quality of SBAS assistance that can be returned depends on how accurately the client has estimated their position in the request message. A highly accurate estimate will be rewarded with very detailed SBAS assistance. A rough estimate can only result in a larger or world-wide SBAS assistance.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
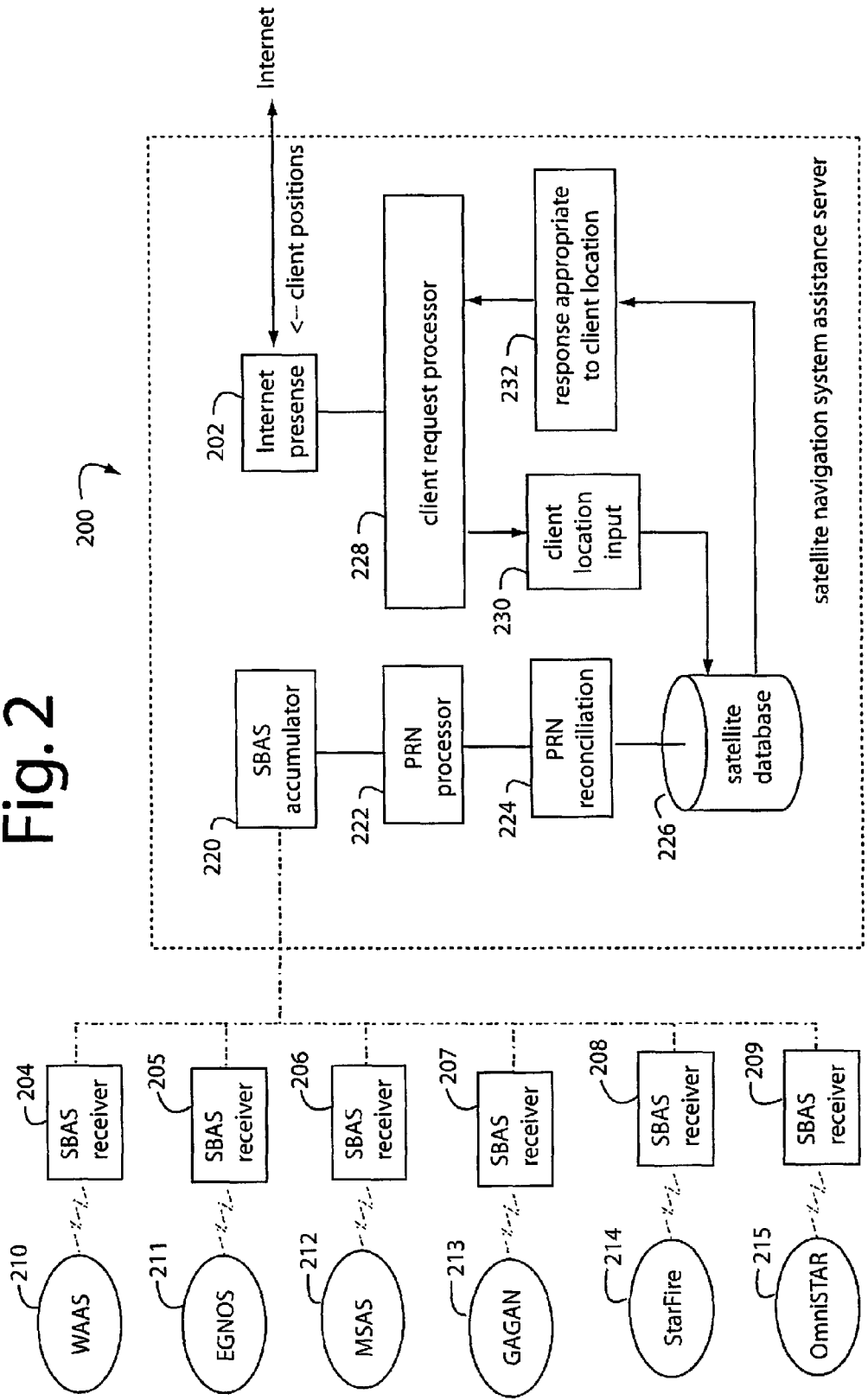

FIG. 1 is a functional block diagram of an SBAS configuration and system embodiment of the present invention; and FIG. 2 is a functional block diagram of a satellite navigation system assistance server, in an embodiment of the present invention.

DETAILED DESCRIPTION OF THE PREFERRED EMBODIMENT

FIG. 1 represents an SBAS configuration 100 in an embodiment of the present invention. A number of clients 101-104 include satellite navigation receivers that will provide their users with position, velocity, and time information (PVT) based on microware signals they each independently receive from orbiting GPS satellites 106, GLONASS satellites 108, and a regional SBAS system corresponding to the location of the client receiver, e.g., WAAS 111, EGNOS 112, MSAS 113, GAGAN 114, StarFire 115, or OmniSTAR 116. All the SBAS systems 111-116 track and analyze the satellite transmissions from the US Navstar GPS and Russian GLONASS navigation systems. That will include the European Galileo navigation system too when it becomes operational.

Individual satellite vehicles (SV's) are tuned in or differentiated from one another by microwave receivers according to the unique code division multiple access (CDMA) pseudorandom number (PRN) code that they modulate their signals with. A PRN mask message contains a mapping of the corrections provided by the SBAS to a list of 210 possible pseudo-random-noise (PRN) sequences including all the GPS, GLONASS, future GNSS, and the SBAS satellites themselves. For example, if PRN1 of GPS has not been launched and PRN2 has, then a PRN mask for that situation would have a zero for an enabling-bit in bit position-1 and a one for an enabling-bit in bit position-2.

The very first correction message would then correspond to GPS PRN2. A PRN mask is a table of launched satellites, and can be quickly inspected for which PRN's to allow, and which ones to exclude from receiver signal searches. Informing an initializing navigation receiver on which SV's are in the sky above at any one instant, means that no time will be wasted acquiring SV's. Only the corresponding PRN's should be searched. This of course requires that the receiver should have a pretty good starting point in terms of where it is and what time it is. The almanacs will then be useful as references to show which SV's, and their PRN's, will be in the sky at various times and places. However, the main purpose of a PRN mask is to map individual corrections in the SBAS data stream to a specific PRN of a specific GNSS.

Corresponding SBAS receivers 121-126 are strategically located throughout the world to receive the regional transmissions from each of the SBAS systems 111-116, e.g., in North America, Asia, and Europe. Each SBAS system has at least one geostationary satellite. Each SBAS receiver 121-126 reports both SBAS data and navigation system satellite data (GPS and GLONASS) to an Internet server 130. Since it's very possible a particular orbiting navigation satellite is simultaneously visible to more than one SBAS system 111-116, a PRN reconciliation processor 132 harmonizes the data. The results for every satellite, including SBAS geostationary satellites, are all stored in a satellite PRN database 134.

The information stored in satellite database 134 can usually be obtained quicker over the Internet by a client 101-104 when it's starting up, compared to trying to directly download the corresponding SBAS transmissions from WAAS 111, EGNOS 112, MSAS 113, GAGAN 114, StarFire 115, or OmniSTAR 116. The server 130 can send the client 101-104 the appropriate SBAS data in a short message, or all the SBAS data it has in a much longer message. In some situations, the client 101-104 may not have the Internet connection bandwidth necessary to accept the longer SBAS messages. So if the client 101-104 sends the server 130 its rough location, the server can return a PRN mask, independently evaluated satellite health, differential-GPS, and SBAS ephemeris and almanac information limited to the particular client's immediate needs. The server also must send an appropriate PRN mask for each SBAS system. Each SBAS system is maintained independently and any two SBAS systems may not be the same in this regard at all times. Thus, the PRN mask for each system must be communicated. Each SBAS system may handle new and old satellites differently, even though the launched GNSS satellites change very infrequently.

Based on the data it collects, independent of actually measuring the phase or frequency of the satellites, the server 130 can provide overall health information of each and all the GPS/SBAS satellites. Clients 101-104 do not use signals from un-healthy or high error satellites. The server provides DGPS corrections for all satellites in a message that can be used before each client actually begins tracking the SBAS satellites. These can be used as an initial DGPS correction before directly receiving data from the SBAS locally. Lower accuracy DGPS corrections are used for approximate locations. High accuracy DGPS corrections are returned if the client 101-104 provides an accurate location. Server 130 computes ionospheric delays at the exact locations provided by the clients 101-104. Ephemeris and/or almanac of the visible SBAS satellites as well as their corresponding PRN mask (map of PRN to index into corrections provided) can be provided according to the provided estimated position. This is very reliable when receiver location is known and is less reliable when only approximate. Clients can quickly negotiate with the server as soon as each obtains a confident position fix to get the most accurate and recent corrections.

Server 130 sorts and gradates its replies to each client request according to the quality of the client position information the client provided in their request according to an estimated position error represented by a position error standard deviation (position sigma). The better the client's position estimate is, the smaller the position sigma, and the more precise the server 130 can be in its assistance. If the client receiver has an accurate location, the server 130 can differentiate between the SBAS systems that are observable, and then replies with only pertinent information that makes for a more compact message format.

In an autonomous mode, a first order of business for a client receiver is to fetch the appropriate PRN mask, so it can thereafter make use of the available SBAS messages. Collecting a PRN mask can take up to a minute. After receiving the PRN mask, the client receiver must settle on the appropriate satellite health and differential GPS corrections to use. The ephemerides are needed to range the SBAS satellites for calculations of a position fix.

But, getting the ephemerides has to be a lower priority than getting the satellite health and differential GPS corrections. This priority is set by the satellite as the highest priority is to provide integrity and corrections, and thus, the ephemeris is cycled through the message stream at a less deterministic rate. An autonomous SBAS receiver will generally not have the necessary SBAS data available before a first fix is possible. Using server 130, the receivers at clients 101-104 can make use of the SBAS information much faster, and the first fixes they each produce will be highly reliable.

In embodiments of the present invention, the first fix can benefit from SBAS integrity checks and corrections, and still be fast. The first fixes are faster than conventional receivers that wait for the SBAS information.

Reference stations are able to track all SBAS satellites they have in view. What is different about SBAS satellites is that they are regional, and not well interconnected. In contrast, GPS provides for complete information to be obtained in a single almanac that is transmitted by all the GPS satellites. SBAS systems are regional, or almost nationalistic. This is a significant problem since the PRN masks provided by the several SBAS systems are not harmonized. So there can be a long delay from receiving a corrections message to being able to use it to correct a particular PRN that the client receiver may be tracking.

Embodiments of the present invention build what amounts to a world wide reference station (WWRS) that sorts out which PRN's are visible in each area at various times of the day. Each SBAS system transmits its own PRN mask that maps an arbitrary index of transmitted DGPS and integrity information to a specific PRN of each satellite. Different SBAS systems, e.g., WAAS and EGNOS could transmit a different correction index for the same PRN.

As a first step, server 130 includes a method to tell which SBAS PRN's to search for in a given location, and then provides the PRN mask for a given SBAS PRN, e.g., a handshake operation. The receiver would provide its location, and then the server would reply with the info. This is a significant improvement since without this help, a client may have to search through as many as eighteen SBAS PRN's. Alternatively, a longitude table could be used indicate which SBAS PRN's are visible and which systems they belong to, since the SBAS satellites are each geostationary. For example, at each few degrees of longitude, the table would indicate which SBAS PRN's are above the horizon.

DGPS corrections and integrity collected from SBAS receivers are forwarded to the GPS receivers. SBAS is advantageous in that it provides fast, slow, and also spatial corrections, and a complex surface of total electron content (TEC) that allows for quite good ionospheric modeling based upon the pierce point through the surface according to the vector form the receiver to the GPS satellite.

Each SBAS reference station receiver 121-126 could only be a data collection station, one that would not need to measure phase. The SBAS system has that network of advanced dual frequency reference stations that are used to decompose the line-of-sight, special, and local ionospheric errors.

One application for embodiments of the present invention is indoor timing where it is impossible to directly receive the SBAS broadcasts because they are too weak.

SBAS satellites have relatively higher power, but because of the faster data rate (encoding 250-bps using 500-Hz data modulation) it is not possible to get high sensitivity beyond 2-milliseconds of coherent integration. GPS is about 20-milliseconds, which is 10-dB more sensitive for data collection.

A major application will be for indoor timing, the eRide server will provide ephemeris from GPS RS and also integrity and DGPS correction and SBAS ephemeris from SBAS RS.

The big advantage of SBAS DGPS and integrity is that it is within ten seconds. For smaller satellite errors, the SBAS provides the spatial DGPS correction, for larger errors, the SBAS declare the SV unhealthy. This means, there is much more integrity using SBAS. For indoor timing, high sensitivity techniques can be used to determine the GPS PRN codephase but without z-count and navData. And with the server providing ephemeris for usability, and SBAS for DGPS and integrity, a robust system will be possible.

Another application for fast start, is to use the server to provide the PRN mask and SBAS ephemeris. Currently, this takes as much as two minutes, and the SBAS data message is priority driven and does not have a fixed message pattern. The PRN mask is a low priority message, the integrity and corrections are the high priority. So the time needed to get a PRN mask and SBAS ephemeris can be lengthy.

The format of the SBAS ephemeris is a Cartesian second order polynomial for X,Y,Z, since the SV has an elliptical orbit. It does not have the long persistence of a GPS ephemeris which is more locally linear. A long term SBAS ephemeris provided to the receivers could shorten the wait times and also reduce data traffic since the receiver does not need to request an ephemeris every session.

Getting the PRN mask delays getting DGPS corrections and integrity, since the corrections are sent by arbitrary index. So providing the PRN mask more quickly could speed up using SBAS so that SBAS can help in the first fix. In general, GPS satellites become usable for fixing before SBAS satellites do, since the complete GPS model is sent every thirty seconds compared with SBAS systems that send the PRN mask as infrequently as once a minute.

FIG. 2 represents a satellite navigation system assistance server 200, in an embodiment of the present invention. The assistance server 200 comprises an Internet presence 202 accessible to client satellite navigation system receivers. It connects to a plurality of SBAS reference receivers 204-209 for placement at strategic location around the world, and each one corresponding to and configured to receive and process SBAS broadcasts from one of the independent SBAS systems 210-215, e.g. WAAS, EGNOS, MSAS, and GAGAN. An SBAS accumulator 220 collects corresponding SBAS messages from the plurality of SBAS reference receivers 204-209, and computes satellite vehicle (SV) health, DGPS information for every GLONASS, GPS, and Galileo SV as well as each SBAS satellites ephemeris and almanac. A PRN processor 222 identifies the SV's according to their assigned pseudorandom number (PRN) modulation codes, and collects the super set of PRN masks that will be readable for particular clients according to the SBAS systems visible at their respective places around the world. A PRN reconciliation processor 224 reconciles particular PRN's that are duplicated between the independent SBAS systems 210-215. Corrections and health may be slightly dissimilar. The respective SBAS systems have different perspectives from their particular reference station locations. A PRN database 226 stores information generated by the SBAS accumulator 220, the PRN processor 222, and the PRN reconciliation processor 224 according to the PRN's of corresponding SV's.

A client request processor 228 responds to clients over the Internet that require pertinent SBAS information 232 as to SV health, DGPS information, and SBAS ephemeris and almanac, and for providing an appropriate PRN mask from the PRN database. In case they provide an idea of their present location 230 and request a compact reply, the server can reduce the volume of SBAS ephemeris and mask information to only that which will be useful.

In general, each server 130 and 200 responds to client requests with DGPS corrections and health for any GPS, GLONASS, Galileo, and SBAS satellites based on data received from at least one SBAS reference station monitoring at least one SBAS system. They also provide a world-wide PRN mask, e.g., a set of individual PRN masks referenced by the PRN used by the transmitting SBAS satellite. The client can use these PRN masks in advance of searching for any SBAS PRN. A referenced table by longitude is provided to inform the client which SBAS PRN's will be visible and healthy. Clients can then restrict their searches to the SBAS satellites that will be visible. Clients save time in getting the data message from unhealthy SBAS satellites.

Servers 130 and 200 further provide a superset of all the SBAS ephemerides such that any satellite can be quickly used for ranging in a position fix. A long term SBAS ephemeris is included so that the client can use an SBAS for ranging for a long time without having to recollect the ephemeris and not request ephemeris as often from the server 130. This also helps in cases where the received signals are too weak to get data, but strong enough to discern the codephase.

The amount of SBAS and GNSS information sent can be minimized if the client provides a position and an error estimate. The server 130 or 200 can then computes a range of longitudes (LongMin,LongMax), and sends the pertinent SBAS and GNSS information for visible satellites inside such longitude range, the DGPS corrections and health of the respective satellites, the ephemerides for the healthy satellites, and a super set of PRN masks for each SBAS or GNSS PRN visible in the range of longitudes. In general, the corrections are of short term value (such as 10-30 seconds), whereas the PRN mask and ephemeris are of longer term value (PRN mask changes at satellite launch rate and ephemeris is valid for about 15 minutes). In weak signal conditions, where only SBAS codephase is available (when the received SNR is below the reliable decode level), or when the SBAS signal is not available at all, the client receiver can still maintain high accuracy and integrity by continuously requesting latest health and corrections, but could re-use the ephemeris a longer time.

Client can economize on power that would otherwise be consumed during searches, and reduce acquisition time by only searching the SBAS PRN's that are visible. The integrity will be improved because the first fixes and continuous fixes where GPS alone cannot be tracked are always derived from SBAS DGPS and integrity.

When determining the DGPS corrections at any time, the server 130 or 200 determines which SBAS system has better coverage of a particular SV, and preferentially provides the DGPS corrections based on that SBAS system. Which SBAS system to use for the ionospheric model depends on the one with a slant angle to the pierce point of the ionosphere that is the closest to 90-degrees, e.g., the user location is in the center of the ionospheric map. A feed forward of all latest SBAS information is provided when requested which means the client receiver might not have to track the SBAS satellite at all to get DGPS and integrity if it doesn't need the additional ranging provided by the SBAS satellites.

There may be a need to reconcile any potential health or DGPS correction difference between systems. For example, the ionospheric models are more accurate in the US when using WAAS SV's. Another ionospheric model for the same PRN, e.g., could come from the EGNOS. In a master DGPS correction, the US system, WAAS would be preferred if the user position was closer.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of the invention.

What is claimed is:

1. An improved assisted satellite navigation system, comprising:
    a plurality of SBAS reference receivers for strategic location around the world to receive a corresponding SBAS message[s] from at least the WAAS, EGNOS, MSAS, and GAGAN SBAS systems;
    the improvement characterized by:
    a satellite navigation system assistance server for collecting corresponding SBAS messages from the plurality of SBAS reference receivers, and for computing satellite vehicle (SV) health, DGPS information, SBAS ephemeris and almanac, and PRN masks for different parts of the world;
    a PRN reconciliation process for reconciling particular PRN's that are duplicated between independent SBAS systems; and
    a PRN database for storing said SBAS messages collected from the plurality of SBAS reference receivers according to said SBAS reference receivers PRN's;
    wherein, the satellite navigation system assistance server is configured to reply to client requests that include an indication of the client's location, and if an accurate location is included in the server request, the satellite navigation system assistance server computes which particular SBAS systems are observable to the requesting client, and in this case the satellite navigation system assistance server limits replies to said request to pertinent information for a more compact response message.

2. The improved assisted satellite navigation system of claim 1, further characterized by:
    wherein, satellite navigation system assistance server responds to client requests with DGPS corrections and health for any GPS, GLONASS, Galileo, and SBAS satellites based on data received from at least one SBAS reference station monitoring at least one SBAS system, and provide a world-wide PRN mask referenced by the PRN used by the transmitting SBAS satellite, and such that clients can use these PRN masks in advance of searching for any SBAS PRN, and a reference table by longitude is provided to inform the clients which SBAS PRN's will be visible and healthy such that clients can then restrict their searches to the SBAS satellites that will be visible, and such that clients save time in getting the data message from unhealthy SBAS satellites.

3. The improved assisted satellite navigation system of claim 1, further characterized by:
wherein, satellite navigation system assistance server provides a superset of all SBAS ephemerides such that any satellite can be quickly used for ranging in a position fix, and a long term SBAS ephemeris is included so that the client can use an SBAS for a longer ranging usability time to help in cases where the received signals are too weak to get data, but strong enough to discern the codephase.

4. The improved assisted satellite navigation system of claim 1, further characterized by:
wherein, satellite navigation system assistance server is configured so the amount of SBAS and GNSS information sent can be minimized if the client provides a position and an error estimate, wherein a range of longitudes is computed and the pertinent SBAS and GNSS information is sent to the respective clients for visible satellites inside such longitude range, the DGPS corrections and health of the respective satellites, the ephemerides for the healthy SBAS satellites, and a super set of PRN masks for each SBAS or GNSS PRN visible in the range of longitudes.

5. The improved assisted satellite navigation system of claim 1, wherein a client can thereby economize on power that would otherwise be consumed during searches, and reduce acquisition time by only searching the SBAS PRN's that are visible.

6. The improved assisted satellite navigation system of claim 1, wherein satellite navigation system assistance server is such that when determining DGPS corrections, a SBAS system that has better coverage of a particular SV is selected, and provides DGPS corrections based on that SBAS system.

7. The improved assisted satellite navigation system of claim 1, wherein satellite navigation system assistance server is such that when determining which SBAS system to use for an ionospheric model favors the one with a slant angle to the pierce point of the ionosphere that is the closest to 90-degrees, and feed forward of all current SBAS information is provided when requested.

8. The improved assisted satellite navigation system of claim 1, wherein satellite navigation system assistance server is such that it reconciles health and DGPS correction differences that are detected between SBAS systems.

9. A satellite navigation system assistance server, comprising:
an Internet presence accessible to client satellite navigation system receivers;
a plurality of SBAS reference receivers for strategic location around the world, and each one corresponding to and configured to receive and process SBAS broadcasts from one of the independent WAAS, EGNOS, MSAS, and GAGAN SBAS systems;
an SBAS accumulator for collecting corresponding SBAS messages from the plurality of SBAS reference receivers, and for computing GNSS satellite vehicle (SV) health, DGPS information, SBAS ephemeris and almanac;
a PRN processor for identifying the SV's according to their assigned pseudorandom number (PRN) modulation codes, and for forwarding the appropriate PRN masks for particular clients according to the SBAS satellites visible to their respective places around the world;
a PRN database for storing information generated by the SBAS accumulator and the PRN processor, according to the PRN's of corresponding SV's; and
a client request processor for responding to clients over the Internet who supply at least a general idea of their present location and that require pertinent GNSS information as to SV health, DGPS information, and SBAS ephemeris and almanac, and for providing an appropriate PRN mask from the PRN database;
wherein, the satellite navigation system assistance server is configured to reply to client requests that include an indication of the client's location, and if an accurate location is included in the server request, the satellite navigation system assistance server computes which particular SBAS systems are observable to the requesting client, and in this case the satellite navigation system assistance server limits replies to pertinent information for a more compact response message.

* * * * *